(12) United States Patent
Wickman et al.

(10) Patent No.: US 7,389,764 B1
(45) Date of Patent: Jun. 24, 2008

(54) LOW EMISSIONS DIESEL PISTON

(75) Inventors: David D. Wickman, Madison, WI (US); Shengming Chang, Troy, MI (US); Ramachandra Diwakar, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/625,833

(22) Filed: Jan. 23, 2007

(51) Int. Cl.
*F02F 3/14* (2006.01)
*F02F 3/26* (2006.01)

(52) U.S. Cl. ................................. 123/279
(58) Field of Classification Search ............. 123/279, 123/253, 285, 193.4, 275, 276, 261
See application file for complete search history.

(56) References Cited

U.S. PATENT DOCUMENTS

| | | | | |
|---|---|---|---|---|
| 2,851,019 | A * | 9/1958 | Fleming et al. | 123/262 |
| 4,953,528 | A * | 9/1990 | Oikawa et al. | 123/276 |
| 5,029,563 | A * | 7/1991 | Hu | 123/262 |
| 6,637,402 | B2 * | 10/2003 | Liu | 123/279 |
| 6,705,273 | B1 * | 3/2004 | Liu et al. | 123/263 |
| 6,732,702 | B2 * | 5/2004 | Liu et al. | 123/279 |
| 6,799,551 | B2 * | 10/2004 | Nakakita et al. | 123/295 |
| 6,910,459 | B2 * | 6/2005 | Sun et al. | 123/275 |
| 6,935,301 | B2 * | 8/2005 | Liu | 123/294 |
| 6,945,210 | B2 * | 9/2005 | Liu | 123/193.4 |
| 6,997,158 | B1 * | 2/2006 | Liu | 123/279 |
| 2003/0024498 | A1 * | 2/2003 | Liu | 123/279 |
| 2003/0136372 | A1 * | 7/2003 | Liu et al. | 123/279 |
| 2005/0066929 | A1 * | 3/2005 | Liu | 123/193.4 |
| 2005/0081819 | A1 * | 4/2005 | Kim | 123/279 |
| 2006/0090726 | A1 * | 5/2006 | Meffert et al. | 123/279 |

* cited by examiner

Primary Examiner—Mahmoud Gimie

(57) ABSTRACT

A piston for a diesel engine has a crown and a three-dimensional shape defined in an x-y-z coordinate space. The z-axis generally defines a cylinder axis of the piston, and the plane z=0 generally intersects an upper rim of the crown. The piston includes a combustion bowl recessed in the crown. The combustion bowl has a center point on the z-axis and has a two-dimensional partial cross-sectional configuration defined by a peripheral line connecting coordinate points $(x_i, y_i, z_i)$ in the x-y-z coordinate space. The $(x_i, y_i, z_i)$ coordinate points include points from a coordinate set S. The combustion bowl has a three-dimensional axisymmetric configuration defined by rotating the peripheral line 360° about the z-axis.

12 Claims, 3 Drawing Sheets

… (x_n,y_n,z_n).

LOW EMISSIONS DIESEL PISTON

TECHNICAL FIELD

This invention relates to a diesel engine piston having an improved combustion bowl configuration.

BACKGROUND OF THE INVENTION

It is known in the art relating to diesel engines that future governmental emissions regulations require improvements in engine design in order to reduce emissions to meet or exceed these regulations. For example, enhanced air system designs could provide higher rates of cooled EGR (exhaust gas recirculation), thereby reducing $NO_x$ emissions, while enhanced fuel injection systems could reduce the inevitably higher soot emissions that would result from the use of higher EGR rates. Also, combined soot and $NO_x$ emissions aftertreatment systems could reduce emissions from diesel engines. Exhaust aftertreatment systems, however, can be costly and therefore are not the most desirable means of achieving emissions reductions.

In contrast, advancements in the combustion system design could reduce emissions while minimizing the need for costly and unproven diesel exhaust aftertreatment systems. Further, fuel economy, exhaust emissions, and performance of diesel combustion systems are greatly affected by the design of the engine's piston, as well as by the choice of fuel injection and air handling equipment (e.g., turborcharger, EGR system, etc.). Therefore, improvements in diesel engine piston design could advantageously lead to lower emissions without significant increases in cost.

SUMMARY OF THE INVENTION

The present invention provides an improved diesel engine combustion bowl design that allows for enhanced mixing of combustion products with excess air available in the cylinder, simultaneously reducing soot and $NO_x$ emissions. More particularly, the present invention provides a piston having an improved bowl design that is slightly deeper and less reentrant than prior combustion bowl designs. The improved bowl design leads to a reduction in the production of $NO_x$ gases. The present invention also achieves superior tradeoffs of soot (i.e., particulate matter) vs. $NO_x$ emissions and fuel consumption vs. $NO_x$ emissions.

In one embodiment, a piston for an engine has a crown and a three-dimensional shape defined in an x-y-z coordinate space. The z-axis generally defines a cylinder axis of the piston, and the plane z=0 generally intersects an upper rim of the crown. The piston includes a combustion bowl recessed in the crown. The combustion bowl has a center point on the z-axis and has a partial two-dimensional cross-sectional configuration defined by a peripheral line connecting coordinate points $(x_i,y_i,z_i)$ in the x-y-z coordinate space, the coordinate points including points in a coordinate set. The combustion bowl has a three-dimensional axisymmetric configuration defined by rotating the peripheral line 360° about the z-axis.

In an alternative embodiment, the combustion bowl may have a partial two-dimensional cross-sectional configuration defined by a peripheral line connecting coordinate points $(ax_i \pm ab_ix_i, ay_i \pm ac_iy_i, az_i \pm ad_iz_i)$ in the x-y-z coordinate space derived from $(x_i,y_i,z_i)$ coordinate points in the coordinate set. The variable "a" represents a scaling factor while the variables "$b_i$," "$c_i$," and "$d_i$" represent an error factor based upon machine constraints and material durability constraints.

In either embodiment, an edge portion of the peripheral line of the combustion bowl adjacent the upper rim of the crown may have a radius of curvature between 1.5*a millimeters and 2.5*a millimeters, "a" being equal to 1 in the first embodiment.

These and other features and advantages of the invention will be more fully understood from the following description of certain specific embodiments of the invention taken together with the accompanying drawings.

DESCRIPTION OF AN EXEMPLARY EMBODIMENT

Figure 1:
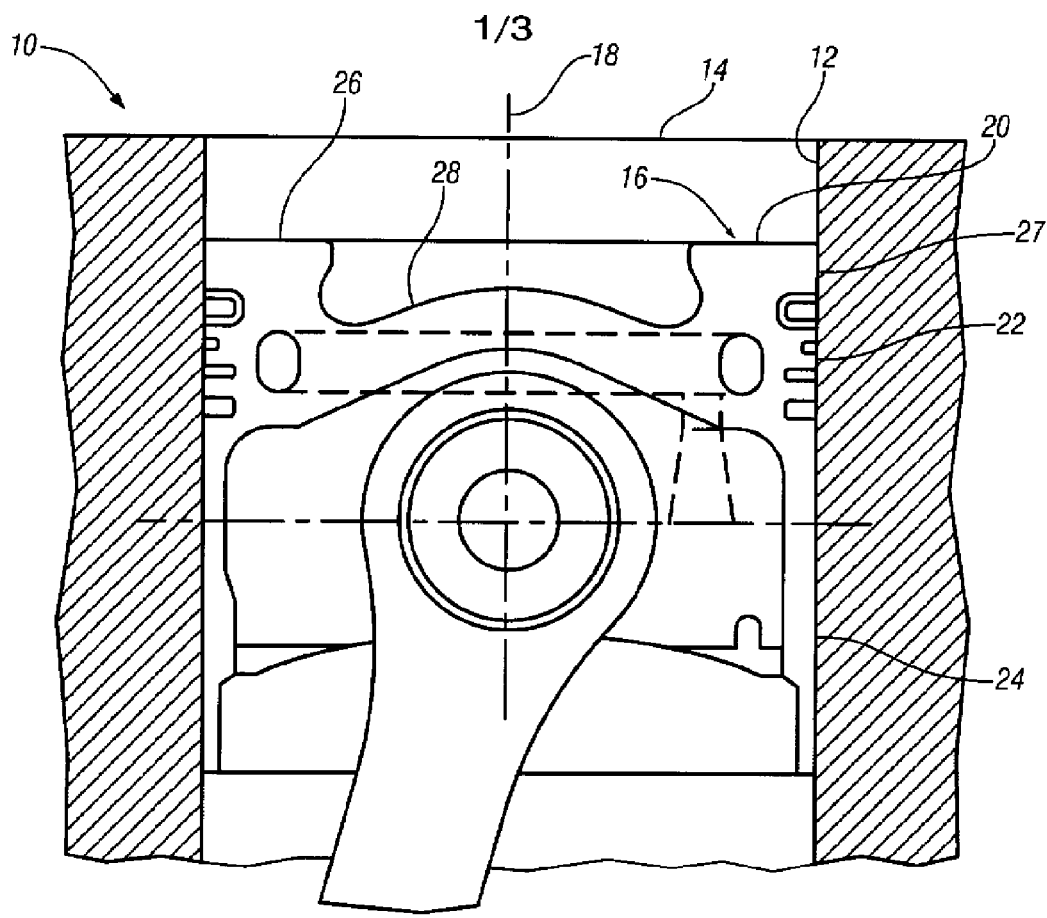
FIG. 1 is a side cross-sectional view of a prior art piston disposed within a cylinder bore of an engine.

Referring first to FIG. 1 of the drawings, numeral 10 generally indicates a known diesel engine including a cylinder 12 having a closed upper end 14. A prior art piston 16 is reciprocable in the cylinder 12 along a central axis 18. The piston 16 generally has a cylindrical shape centered on the axis 18 and includes a crown 20, a ring belt 22 with piston ring grooves and a skirt 24 extending axially from the ring belt 22. The crown 20 has a generally planar upper rim 26 extending inward from a side wall 27 and generally defining the top of the piston 16. A circular combustion bowl 28 is recessed in the crown 20 within the crown rim 24 and centered on the central axis 18. Fuel sprayed from a fuel injector (not shown) is sprayed from the central axis 18 out toward the edge of the combustion bowl 28. The present invention relates to an improved configuration for a combustion bowl for use in place of the bowl 28 shown in the prior art piston 16.

Figure 2:
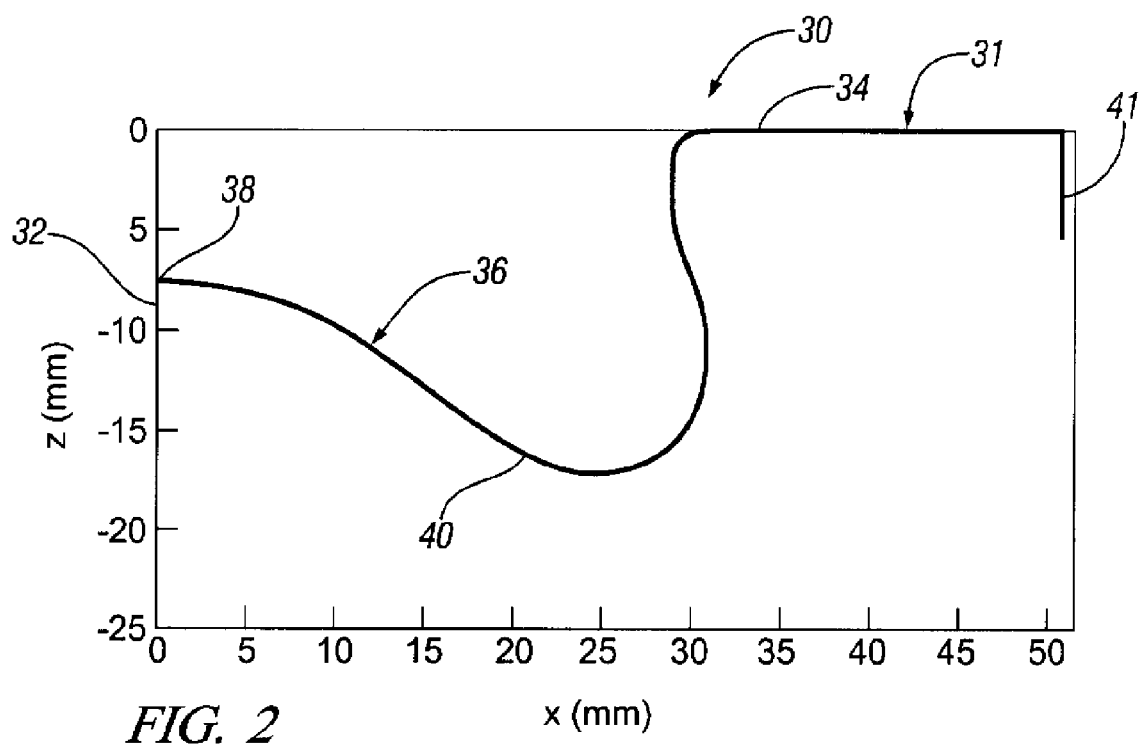
FIG. 2 is a two-dimensional graph illustrating the linear, cross-sectional configuration of a piston bowl in accordance with the present invention.

Referring to FIG. 2, a piston 30 according to the present invention includes a crown 31 and has a three-dimensional shape defined in an x-y-z coordinate space. The z-axis of the coordinate space generally defines a central cylinder axis 32 of the piston 30. The plane z=0 in the coordinate space generally intersects a crown upper rim 34. The piston 30 includes a combustion bowl 36. A center point 38 of the combustion bowl 36 lies on the z-axis. The combustion bowl 36 is axisymmetric (about the z-axis) and has a partial two-dimensional cross-sectional configuration defined by a peripheral line 40 connecting coordinate points $(x_i,y_i,z_i)$ in the x-y-z coordinate space. The two-dimensional graph shown in FIG. 2 is an x-z grid lying in the plane y=0. The ordinal variable "i" represents an integer between 1 and n, "n" being the total number of coordinate points along the peripheral line 40. In other words, the coordinate points along the peripheral line 40 include points $(x_1,y_1,z_1)$, $(x_2,y_2,z_2)$, …, $(x_n,y_n,z_n)$.

The coordinate points $(x_i, y_i, z_i)$ along the peripheral line 40 include coordinate points listed in the following table defining a coordinate set S.

TABLE 1

| | COORDINATE SET S | | |
|---|---|---|---|
| i | $x_i$ (mm) | $y_i$ (mm) | $z_i$ (mm) |
| 1 | 30.4087 | 0.0000 | 0.0000 |
| 2 | 30.3564 | 0.0000 | −0.0009 |
| 3 | 30.3041 | 0.0000 | −0.0037 |
| 4 | 30.2519 | 0.0000 | −0.0082 |
| 5 | 30.1999 | 0.0000 | −0.0146 |
| 6 | 30.1482 | 0.0000 | −0.0228 |
| 7 | 30.0968 | 0.0000 | −0.0328 |
| 8 | 30.0458 | 0.0000 | −0.0446 |
| 9 | 29.9952 | 0.0000 | −0.0581 |
| 10 | 29.9452 | 0.0000 | −0.0734 |
| 11 | 29.8957 | 0.0000 | −0.0905 |
| 12 | 29.8468 | 0.0000 | −0.1092 |
| 13 | 29.7986 | 0.0000 | −0.1297 |
| 14 | 29.7511 | 0.0000 | −0.1518 |
| 15 | 29.7045 | 0.0000 | −0.1756 |
| 16 | 29.6587 | 0.0000 | −0.2010 |
| 17 | 29.6138 | 0.0000 | −0.2279 |
| 18 | 29.5699 | 0.0000 | −0.2564 |
| 19 | 29.5270 | 0.0000 | −0.2865 |
| 20 | 29.4852 | 0.0000 | −0.3180 |
| 21 | 29.4445 | 0.0000 | −0.3509 |
| 22 | 29.4050 | 0.0000 | −0.3853 |
| 23 | 29.3667 | 0.0000 | −0.4210 |
| 24 | 29.3297 | 0.0000 | −0.4580 |
| 25 | 29.2940 | 0.0000 | −0.4963 |
| 26 | 29.2596 | 0.0000 | −0.5358 |
| 27 | 29.2267 | 0.0000 | −0.5765 |
| 28 | 29.1952 | 0.0000 | −0.6183 |
| 29 | 29.1651 | 0.0000 | −0.6612 |
| 30 | 29.1366 | 0.0000 | −0.7051 |
| 31 | 29.1097 | 0.0000 | −0.7500 |
| 32 | 29.0843 | 0.0000 | −0.7958 |
| 33 | 29.0605 | 0.0000 | −0.8424 |
| 34 | 29.0384 | 0.0000 | −0.8899 |
| 35 | 29.0179 | 0.0000 | −0.9381 |
| 36 | 28.9992 | 0.0000 | −0.9870 |
| 37 | 28.9821 | 0.0000 | −1.0365 |
| 38 | 28.9668 | 0.0000 | −1.0865 |
| 39 | 28.9533 | 0.0000 | −1.1371 |
| 40 | 28.9415 | 0.0000 | −1.1881 |
| 41 | 28.9315 | 0.0000 | −1.2395 |
| 42 | 28.9233 | 0.0000 | −1.2912 |
| 43 | 28.9169 | 0.0000 | −1.3432 |
| 44 | 28.9124 | 0.0000 | −1.3954 |
| 45 | 28.9096 | 0.0000 | −1.4477 |
| 46 | 28.9087 | 0.0000 | −1.5000 |
| 47 | 28.9087 | 0.0000 | −2.8505 |
| 48 | 28.9141 | 0.0000 | −3.1944 |
| 49 | 28.9297 | 0.0000 | −3.5224 |
| 50 | 28.9550 | 0.0000 | −3.8355 |
| 51 | 28.9894 | 0.0000 | −4.1358 |
| 52 | 29.0325 | 0.0000 | −4.4250 |
| 53 | 29.0836 | 0.0000 | −4.7048 |
| 54 | 29.1424 | 0.0000 | −4.9766 |
| 55 | 29.2084 | 0.0000 | −5.2417 |
| 56 | 29.2810 | 0.0000 | −5.5012 |
| 57 | 29.3598 | 0.0000 | −5.7565 |
| 58 | 29.4442 | 0.0000 | −6.0085 |
| 59 | 29.5335 | 0.0000 | −6.2585 |
| 60 | 29.6273 | 0.0000 | −6.5077 |
| 61 | 29.7249 | 0.0000 | −6.7570 |
| 62 | 29.8257 | 0.0000 | −7.0076 |
| 63 | 29.9287 | 0.0000 | −7.2607 |
| 64 | 30.0332 | 0.0000 | −7.5173 |
| 65 | 30.1381 | 0.0000 | −7.7786 |
| 66 | 30.2424 | 0.0000 | −8.0455 |
| 67 | 30.3445 | 0.0000 | −8.3189 |
| 68 | 30.4430 | 0.0000 | −8.5997 |
| 69 | 30.5361 | 0.0000 | −8.8885 |
| 70 | 30.6217 | 0.0000 | −9.1860 |

TABLE 1-continued

| | COORDINATE SET S | | |
|---|---|---|---|
| i | $x_i$ (mm) | $y_i$ (mm) | $z_i$ (mm) |
| 71 | 30.6973 | 0.0000 | −9.4922 |
| 72 | 30.7604 | 0.0000 | −9.8076 |
| 73 | 30.8084 | 0.0000 | −10.1331 |
| 74 | 30.8398 | 0.0000 | −10.4698 |
| 75 | 30.8534 | 0.0000 | −10.8171 |
| 76 | 30.8473 | 0.0000 | −11.1744 |
| 77 | 30.8203 | 0.0000 | −11.5402 |
| 78 | 30.7706 | 0.0000 | −11.9134 |
| 79 | 30.6967 | 0.0000 | −12.2922 |
| 80 | 30.5972 | 0.0000 | −12.6752 |
| 81 | 30.4706 | 0.0000 | −13.0599 |
| 82 | 30.3159 | 0.0000 | −13.4440 |
| 83 | 30.1320 | 0.0000 | −13.8251 |
| 84 | 29.9179 | 0.0000 | −14.2002 |
| 85 | 29.6733 | 0.0000 | −14.5662 |
| 86 | 29.3976 | 0.0000 | −14.9200 |
| 87 | 29.0912 | 0.0000 | −15.2581 |
| 88 | 28.7544 | 0.0000 | −15.5772 |
| 89 | 28.3880 | 0.0000 | −15.8737 |
| 90 | 27.9933 | 0.0000 | −16.1441 |
| 91 | 27.5720 | 0.0000 | −16.3853 |
| 92 | 27.1261 | 0.0000 | −16.5941 |
| 93 | 26.6579 | 0.0000 | −16.7677 |
| 94 | 26.1704 | 0.0000 | −16.9033 |
| 95 | 25.6667 | 0.0000 | −16.9988 |
| 96 | 25.1501 | 0.0000 | −17.0525 |
| 97 | 24.6241 | 0.0000 | −17.0631 |
| 98 | 24.0909 | 0.0000 | −17.0301 |
| 99 | 23.5501 | 0.0000 | −16.9539 |
| 100 | 23.0012 | 0.0000 | −16.8361 |
| 101 | 22.4447 | 0.0000 | −16.6782 |
| 102 | 21.8811 | 0.0000 | −16.4828 |
| 103 | 21.3114 | 0.0000 | −16.2528 |
| 104 | 20.7368 | 0.0000 | −15.9915 |
| 105 | 20.1580 | 0.0000 | −15.7026 |
| 106 | 19.5765 | 0.0000 | −15.3902 |
| 107 | 18.9932 | 0.0000 | −15.0583 |
| 108 | 18.4091 | 0.0000 | −14.7110 |
| 109 | 17.8250 | 0.0000 | −14.3523 |
| 110 | 17.2417 | 0.0000 | −13.9860 |
| 111 | 16.6599 | 0.0000 | −13.6156 |
| 112 | 16.0801 | 0.0000 | −13.2446 |
| 113 | 15.5027 | 0.0000 | −12.8758 |
| 114 | 14.9283 | 0.0000 | −12.5121 |
| 115 | 14.3571 | 0.0000 | −12.1558 |
| 116 | 13.7894 | 0.0000 | −11.8088 |
| 117 | 13.2254 | 0.0000 | −11.4731 |
| 118 | 12.6651 | 0.0000 | −11.1501 |
| 119 | 12.1088 | 0.0000 | −10.8408 |
| 120 | 11.5564 | 0.0000 | −10.5463 |
| 121 | 11.0080 | 0.0000 | −10.2673 |
| 122 | 10.4638 | 0.0000 | −10.0041 |
| 123 | 9.9249 | 0.0000 | −9.7577 |
| 124 | 9.3943 | 0.0000 | −9.5280 |
| 125 | 8.8748 | 0.0000 | −9.3149 |
| 126 | 8.3678 | 0.0000 | −9.1178 |
| 127 | 7.8745 | 0.0000 | −8.9360 |
| 128 | 7.3952 | 0.0000 | −8.7689 |
| 129 | 6.9301 | 0.0000 | −8.6156 |
| 130 | 6.4790 | 0.0000 | −8.4753 |
| 131 | 6.0414 | 0.0000 | −8.3473 |
| 132 | 5.6166 | 0.0000 | −8.2307 |
| 133 | 5.2036 | 0.0000 | −8.1249 |
| 134 | 4.8017 | 0.0000 | −8.0291 |
| 135 | 4.4096 | 0.0000 | −7.9427 |
| 136 | 4.0263 | 0.0000 | −7.8651 |
| 137 | 3.6505 | 0.0000 | −7.7958 |
| 138 | 3.2811 | 0.0000 | −7.7344 |
| 139 | 2.9166 | 0.0000 | −7.6803 |
| 140 | 2.5558 | 0.0000 | −7.6333 |
| 141 | 2.1972 | 0.0000 | −7.5931 |
| 142 | 1.8394 | 0.0000 | −7.5593 |
| 143 | 1.4806 | 0.0000 | −7.5319 |
| 144 | 1.1192 | 0.0000 | −7.5106 |

TABLE 1-continued

COORDINATE SET S

| i | $x_i$ (mm) | $y_i$ (mm) | $z_i$ (mm) |
|---|---|---|---|
| 145 | 0.7534 | 0.0000 | −7.4954 |
| 146 | 0.3811 | 0.0000 | −7.4862 |
| 147 | 0.0000 | 0.0000 | −7.4832 |

The values of the coordinate points $(x_i, y_i, z_i)$ represent lengths in units of millimeters. For example, the coordinates (28.9533, 0.0000, −1.1371) represent a point in the x-y-z coordinate space that is +28.9533 mm in the x-direction, 0.0000 mm in the y-direction, and −1.1371 mm in the z-direction.

The bowl design depicted by the peripheral line 40 is axisymmetric and therefore, it is only necessary to show the configuration of the bowl 36 to the right or left of the z-axis to illustrate the shape of the bowl design. For example, in FIG. 2, the configuration of the combustion bowl 36 is shown to the right of the z-axis. The three-dimensional configuration of the combustion bowl 36 can be obtained by rotating the peripheral line 40 360 degrees about the z-axis. From the graph of FIG. 2, it can then be seen that the combustion bowl 36 generally has an outer width (or diameter) varying around an approximate value of 60 millimeters and a depth generally ranging between approximately 7.5 and 17 millimeters. Further, as shown in FIG. 2, in a specific embodiment, a sidewall 41 of the crown 31 has a radius of approximately 50.979 millimeters. Correspondingly, in this embodiment the cylinder bore receiving the piston 30 has a diameter of approximately 103 millimeters.

Figure 3:
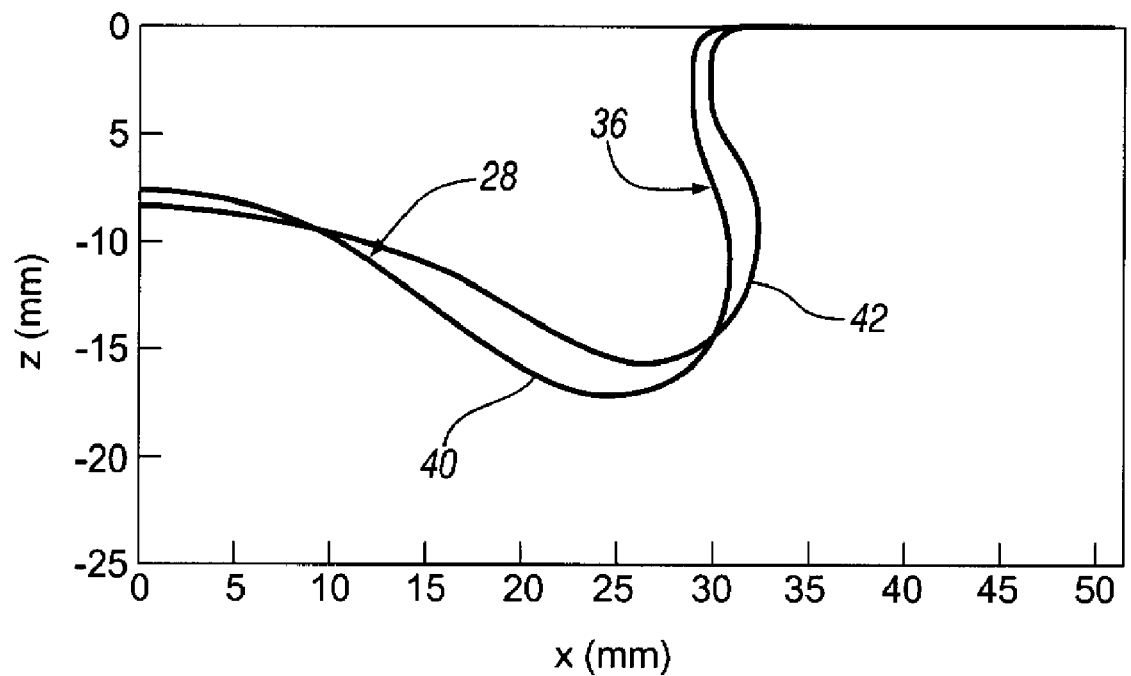
FIG. 3 is a two-dimensional graph comparing the piston bowl configuration of FIG. 2 with a prior art piston bowl configuration.

As shown in FIG. 3, a comparison between the configuration of the combustion bowl 36 of the present invention and the prior art combustion bowl 28 illustrates that the present combustion bowl configuration is deeper and less reentrant than the prior art. The present combustion bowl 36 is represented by the peripheral line 40 while the prior art combustion bowl 28 is represented by peripheral line 42. These design features of the present combustion bowl 36 provide for a decrease in soot and $NO_x$ emissions while also reducing fuel consumption, as described in more detail below.

Figure 4:
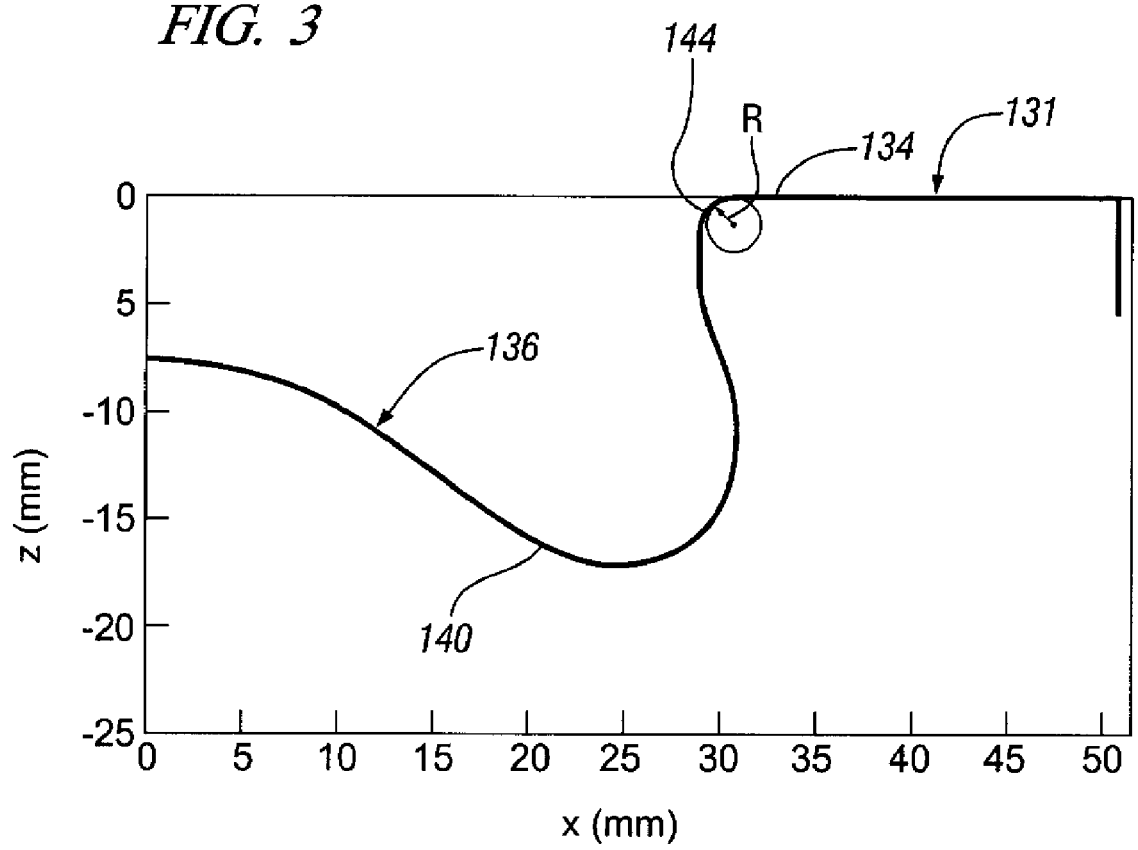
FIG. 4 is a two-dimensional graph illustrating an alternative embodiment of a piston bowl according to the present invention.

Turning to FIG. 4, in an alternative embodiment, an edge portion 144 of the peripheral line 140 of the bowl 136 generally disposed between the coordinate points (30.4087, 0, 0) and (28.9087, 0, −1.5000) may have a radius of curvature R between 1.5 millimeters and 2.5 millimeters. The combustion bowl 136 otherwise has the same characteristics as the combustion bowl 36 shown in FIG. 2 and described above. In other words, the edge 144 of the combustion bowl 136 adjacent the upper rim 134 of the crown 131 may be rounded off with a sharper or softer radius than the embodiment of FIG. 2 without negatively affecting the performance of the combustion bowl 136.

Figure 5:
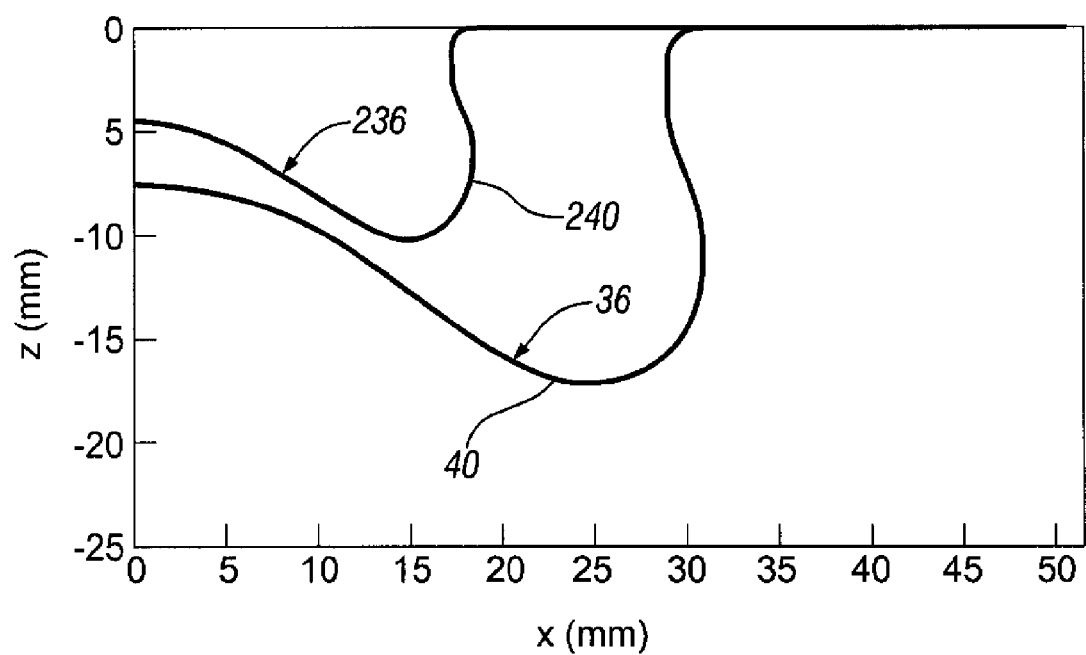
FIG. 5 is a two-dimensional graph comparing the piston bowl configuration of FIG. 2 and an alternative piston bowl according to the present invention that has been scaled down in size by a factor.

As shown in FIG. 5, the coordinate points $(x_i, y_i, z_i)$ may be multiplied by a factor "a" such that a combustion bowl 236 in accordance with the present invention has a cross-sectional axisymmetric configuration defined by a two-dimensional peripheral line 240 connecting coordinate points $(ax_i, ay_i, az_i)$ in the x-y-z coordinate space derived from the $(x_i, y_i, z_i)$ coordinate points in Table 1 above. The factor "a" may be any real number having a value greater than zero. Preferably, the factor "a" has a value in approximately in the range of 0.5 to 2. In effect, the combustion bowl configuration 236 is a scaled version (enlargement or contraction) of the combustion bowl 36 and is in all other aspects identical to the combustion bowl 36. The combustion bowl 236 has the same configuration as the combustion bowl 36, but may be smaller or larger than the combustion bowl 36, depending on the value of the factor "a." For example, if the factor "a" is equal to 0.5, then the dimensions of the combustion bowl 236 are half the size of those of the combustion bowl 36. Similarly, if the factor "a" is equal to 2, then the dimensions of the combustion bowl 236 are twice as large as those of the combustion bowl 36. In the case that the factor "a" is equal to 1, the combustion bowl 236 is identical to the combustion bowl 36. Also, although not shown, in this embodiment an edge portion of the peripheral line 240 of the bowl 236 generally disposed between the coordinate points (30.4087*a, 0, 0) and (28.9087*a, 0, −1.5000*a) may have a radius of curvature a*R between 1.5*a millimeters and 2.5*a millimeters. This feature is similar to the feature of the embodiment of FIG. 4.

Further, though not shown in the drawings, minor variations in the configuration of the combustion bowl 36 due to manufacturing and durability constraints are within the scope of the present invention. Therefore, a combustion bowl in accordance with the present invention may have a partial two-dimensional cross-sectional configuration defined by a peripheral line connecting coordinate points $(x_i \pm b_i x_i, y_i \pm c_i y_i, z_i \pm d_i z_i)$ in the x-y-z coordinate space derived from the $(x_i, y_i, z_i)$ coordinate points in Table 1. As above, the ordinal variable "i" represents an integer between 1 and n, "n" being the total number of coordinate points along the peripheral line defining the combustion bowl configuration. The variables "$b_i$," "$c_i$," and "$d_i$" are independent decimal numbers having values between and including zero and 0.01 for each value of "i." For example, the variable "$b_i$" may have a value of zero when i=1 and a value of 0.005 when i=2. Also, the variable "$b_i$" may have a value of 0.001 when i=1 while the variable "$c_i$" may have a value of 0.007 when i=1. The variables "$b_i$," "$c_i$," and "$d_i$" in effect represent the percent in decimal form of the allowable variation (error) in the configuration of the combustion bowl at any point along the peripheral line of the bowl due to the constraints of the machine machining the piston and the durability constraints of the material of the piston. In the case that "$b_i$," "$c_i$," and "$d_i$" are all equal to zero for each value of "i," then the combustion bowl has a configuration identical to the configuration of the piston bowl 36 in FIG. 2.

As stated above, the combustion bowl 36 of the present invention is deeper and less reentrant than prior combustion bowl designs. The improved design of the combustion bowl 36 achieves simultaneous reduction of soot and $NO_x$ emissions by providing enhanced mixing of combustion products with excess air available in the cylinder. Further, the combustion bowl 36 achieves this reduction of soot and $NO_x$ emissions while also maintaining or improving fuel consumption using conventional fuel injection and air handling equipment. Moreover, the combustion bowl 36 may potentially increase power density through the reduction of soot emissions, thereby allowing for higher fueling rates while still meeting governmentally mandated soot emission levels. The combustion bowl 36 of the present invention also advantageously achieves these benefits without additional costs.

The combustion bowl 36 provides enhanced post combustion mixing by directing more of the high temperature post combustion gases into the highly turbulent region near the outer radius of the bowl. This leads to the quenching of the post combustion gases by mixing them with relatively cool excess air present in the combustion bowl 36 on a shorter timescale than that required for significant $NO_x$ production. The kinetic mechanism for $NO_x$ production requires high temperatures and a relatively long timescale ($NO_x$ formation is a relatively slow process compared to other combustion physics). Therefore, quick cooling of post combustion gases reduces $NO_x$ formation.

Further, the relatively flat contour along the outer radius of the combustion bowl 36 (i.e., the combustion bowl 36 being less reentrant than prior combustion bowls) is a more robust design that significantly results in the combustion bowl 36 being less sensitive to spray targeting. The targeting of fuel spray from, for example, a fuel injector, towards the outer radius of a combustion bowl critically affects the subsequent combustion and emissions formation processes. Variations in spray targeting in production engines is inevitable, due to, for example, variations in nozzle spray cone angle, injector nozzle protrusion, etc. Since the combustion bowl 36 is less sensitive to spray targeting, the combustion bowl 36 advantageously provides less variation in the combustion and emissions formation processes due to variations in spray targeting.

Test results have shown that the combustion bowl 36 of the present invention achieves superior results in comparison to prior art combustion bowl designs, such as superior trade-offs between soot emissions and $NO_x$ emissions and between $NO_x$ emissions and fuel consumption. These superior results have been shown at important operating conditions, such as near engine rated power operating conditions. The near rated power operating condition is significant to emissions testing because it generally corresponds to maximum engine output, and therefore, maximum engine emissions. With respect to trade-offs between soot emissions and $NO_x$ emissions, the present combustion bowl 36 provides an approximate 50 percent reduction in soot emissions at a fixed level of $NO_x$ emissions and an approximate 30 percent reduction in $NO_x$ emissions at a fixed level of soot emissions. These results were obtained by varying EGR levels and start of injection ("SOI") timings. Further, with respect to trade-offs between $NO_x$ emissions and fuel consumption, the present combustion bowl 36 provides an approximate 15 to 20 percent reduction in $NO_x$ emissions, an approximate 3 percent reduction in fuel consumption, or some compromise between the two. Similarly, these results were obtained by varying SOI timings at different EGR levels.

In the following claims, the term "coordinate set S" is defined as the set of coordinate points in Table 1 above.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A piston for a diesel engine, the piston having a crown and a three-dimensional shape defined in an x-y-z coordinate space, the z-axis generally defining a cylinder axis of the piston, and the plane z=0 generally intersecting an upper rim of the crown, the piston comprising:
a combustion bowl recessed in the crown, the combustion bowl having a center point on the z-axis and having a two-dimensional partial cross-sectional configuration defined by a peripheral line connecting coordinate points $(x_i,y_i,z_i)$ in the x-y-z coordinate space, the $(x_i,y_i,z_i)$ coordinate points including selected points from a coordinate set S and shown in the following table Sa;

| | COORDINATE SET Sa | | |
|---|---|---|---|
| i | $x_i$ (mm) | $y_i$ (mm) | $z_i$ (mm) |
| 1 | 30.4087 | 0.0000 | 0.0000 |
| 9 | 29.9952 | 0.0000 | −0.0581 |
| 16 | 29.6587 | 0.0000 | −0.2010 |
| 22 | 29.4050 | 0.0000 | −0.3853 |
| 46 | 28.9087 | 0.0000 | −1.5000 |
| 51 | 28.9894 | 0.0000 | −4.1358 |
| 54 | 29.1424 | 0.0000 | −4.9766 |
| 73 | 30.8084 | 0.0000 | −10.1331 |
| 83 | 30.1320 | 0.0000 | −13.8251 |
| 86 | 29.3976 | 0.0000 | −14.9200 |
| 96 | 25.1501 | 0.0000 | −17.0525 |
| 105 | 20.1580 | 0.0000 | −15.7026 |
| 114 | 14.9283 | 0.0000 | −12.5121 |
| 122 | 10.4638 | 0.0000 | −10.0041 |
| 133 | 5.2036 | 0.0000 | −8.1249 |
| 147 | 0.0000 | 0.0000 | −7.4832. |

2. The piston of claim 1, wherein the combustion bowl has a three-dimensional axisymmetric configuration defined by rotating the peripheral line 360° about the z-axis.

3. The piston of claim 1, wherein the coordinate points $(x_i,y_i,z_i)$ are measured in units of millimeters.

4. The piston of claim 1, wherein the crown has an outer sidewall adjacent the crown upper rim, the sidewall having a radius of approximately 50.979 millimeters.

5. The piston of claim 1, wherein an edge portion of the peripheral line of the bowl generally disposed between the coordinate points (30.4087, 0, 0) and (28.9087, 0, −1.5000) has a radius of curvature between 1.5 millimeters and 2.5 millimeters.

6. A piston for a diesel engine, the piston having a crown and a three-dimensional shape defined in an x-y-z coordinate space, the z-axis generally defining a cylinder axis of the piston, and the plane z=0 generally intersecting an upper rim of the crown, the piston comprising:
a combustion bowl recessed in the crown, the combustion bowl having a center point on the z-axis and having a two-dimensional partial cross-sectional configuration defined by a peripheral line connecting coordinate points $(ax_i \pm ab_i x_i, ay_i \pm ac_i y_i, az_i \pm ad_i z_i)$ in the x-y-z coordinate space derived from $(x_i,y_i,z_i)$ coordinate points, the $(x_i,y_i,z_i)$ coordinate points including selected points from a coordinate set S; and shown in the following table Sa;
wherein factor "a" is a real number greater than zero, and "$b_i$," "$c_i$," and "$d_i$" are independent decimal numbers having values between and including zero and 0.01

| | COORDINATE SET Sa | | |
|---|---|---|---|
| i | $x_i$ (mm) | $y_i$ (mm) | $z_i$ (mm) |
| 1 | 30.4087 | 0.0000 | 0.0000 |
| 9 | 29.9952 | 0.0000 | −0.0581 |
| 16 | 29.6587 | 0.0000 | −0.2010 |
| 22 | 29.4050 | 0.0000 | −0.3853 |
| 46 | 28.9087 | 0.0000 | −1.5000 |
| 51 | 28.9894 | 0.0000 | −4.1358 |
| 54 | 29.1424 | 0.0000 | −4.9766 |

-continued

COORDINATE SET Sa

| i | $x_i$ (mm) | $y_i$ (mm) | $z_i$ (mm) |
|---|---|---|---|
| 73 | 30.8084 | 0.0000 | −10.1331 |
| 83 | 30.1320 | 0.0000 | −13.8251 |
| 86 | 29.3976 | 0.0000 | −14.9200 |
| 96 | 25.1501 | 0.0000 | −17.0525 |
| 105 | 20.1580 | 0.0000 | −15.7026 |
| 114 | 14.9283 | 0.0000 | −12.5121 |
| 122 | 10.4638 | 0.0000 | −10.0041 |
| 133 | 5.2036 | 0.0000 | −8.1249 |
| 147 | 0.0000 | 0.0000 | −7.4832. |

7. The piston of claim 6, wherein the combustion bowl has a three-dimensional axisymmetric configuration defined by rotating the peripheral line 360° about the z-axis.

8. The piston of claim 6, wherein the coordinate points ($x_i,y_i,z_i$) are measured in units of millimeters.

9. The piston of claim 6, wherein the crown has an outer sidewall adjacent the crown upper rim, the sidewall having a radius of approximately 50.979*a millimeters.

10. The piston of claim 6, wherein the crown has an outer sidewall adjacent the crown upper rim, the sidewall having a radius of approximately 50.979*a millimeters.

11. The piston of claim 6, wherein an edge portion of the peripheral line of the bowl generally disposed between the coordinate points (30.4087*a±30.4087*a*$b_i$, 0, 0) and (28.9087*a±28.9087*a*$b_i$, 0, −1.5000*a±−1.5000*a*$d_i$) has a radius of curvature between 1.5*a millimeters and 2.5*a millimeters.

12. A piston for a diesel engine, the piston having a crown and a three-dimensional shape defined in an x-y-z coordinate space, the z-axis generally defining a cylinder axis of the piston, and the plane z=0 generally intersecting an upper rim of the crown, the piston comprising:

a combustion bowl recessed in the crown, the combustion bowl having a center point on the z-axis and having a two-dimensional partial cross-sectional configuration defined by a peripheral line connecting coordinate points ($x_i,y_i,z_i$) in the x-y-z coordinate space, the ($x_i,y_i,z_i$) coordinate points comprising points from a coordinate set S shown in the following table

COORDINATE SET S

| i | $x_i$ (mm) | $y_i$ (mm) | $z_i$ (mm) |
|---|---|---|---|
| 1 | 30.4087 | 0.0000 | 0.0000 |
| 2 | 30.3564 | 0.0000 | −0.0009 |
| 3 | 30.3041 | 0.0000 | −0.0037 |
| 4 | 30.2519 | 0.0000 | −0.0082 |
| 5 | 30.1999 | 0.0000 | −0.0146 |
| 6 | 30.1482 | 0.0000 | −0.0228 |
| 7 | 30.0968 | 0.0000 | −0.0328 |
| 8 | 30.0458 | 0.0000 | −0.0446 |
| 9 | 29.9952 | 0.0000 | −0.0581 |
| 10 | 29.9452 | 0.0000 | −0.0734 |
| 11 | 29.8957 | 0.0000 | −0.0905 |
| 12 | 29.8468 | 0.0000 | −0.1092 |
| 13 | 29.7986 | 0.0000 | −0.1297 |
| 14 | 29.7511 | 0.0000 | −0.1518 |
| 15 | 29.7045 | 0.0000 | −0.1756 |
| 16 | 29.6587 | 0.0000 | −0.2010 |
| 17 | 29.6138 | 0.0000 | −0.2279 |
| 18 | 29.5699 | 0.0000 | −0.2564 |

-continued

COORDINATE SET S

| i | $x_i$ (mm) | $y_i$ (mm) | $z_i$ (mm) |
|---|---|---|---|
| 19 | 29.5270 | 0.0000 | −0.2865 |
| 20 | 29.4852 | 0.0000 | −0.3180 |
| 21 | 29.4445 | 0.0000 | −0.3509 |
| 22 | 29.4050 | 0.0000 | −0.3853 |
| 23 | 29.3667 | 0.0000 | −0.4210 |
| 24 | 29.3297 | 0.0000 | −0.4580 |
| 25 | 29.2940 | 0.0000 | −0.4963 |
| 26 | 29.2596 | 0.0000 | −0.5358 |
| 27 | 29.2267 | 0.0000 | −0.5765 |
| 28 | 29.1952 | 0.0000 | −0.6183 |
| 29 | 29.1651 | 0.0000 | −0.6612 |
| 30 | 29.1366 | 0.0000 | −0.7051 |
| 31 | 29.1097 | 0.0000 | −0.7500 |
| 32 | 29.0843 | 0.0000 | −0.7958 |
| 33 | 29.0605 | 0.0000 | −0.8424 |
| 34 | 29.0384 | 0.0000 | −0.8899 |
| 35 | 29.0179 | 0.0000 | −0.9381 |
| 36 | 28.9992 | 0.0000 | −0.9870 |
| 37 | 28.9821 | 0.0000 | −1.0365 |
| 38 | 28.9668 | 0.0000 | −1.0865 |
| 39 | 28.9533 | 0.0000 | −1.1371 |
| 40 | 28.9415 | 0.0000 | −1.1881 |
| 41 | 28.9315 | 0.0000 | −1.2395 |
| 42 | 28.9233 | 0.0000 | −1.2912 |
| 43 | 28.9169 | 0.0000 | −1.3432 |
| 44 | 28.9124 | 0.0000 | −1.3954 |
| 45 | 28.9096 | 0.0000 | −1.4477 |
| 46 | 28.9087 | 0.0000 | −1.5000 |
| 47 | 28.9087 | 0.0000 | −2.8505 |
| 48 | 28.9141 | 0.0000 | −3.1944 |
| 49 | 28.9297 | 0.0000 | −3.5224 |
| 50 | 28.9550 | 0.0000 | −3.8355 |
| 51 | 28.9894 | 0.0000 | −4.1358 |
| 52 | 29.0325 | 0.0000 | −4.4250 |
| 53 | 29.0836 | 0.0000 | −4.7048 |
| 54 | 29.1424 | 0.0000 | −4.9766 |
| 55 | 29.2084 | 0.0000 | −5.2417 |
| 56 | 29.2810 | 0.0000 | −5.5012 |
| 57 | 29.3598 | 0.0000 | −5.7565 |
| 58 | 29.4442 | 0.0000 | −6.0085 |
| 59 | 29.5335 | 0.0000 | −6.2585 |
| 60 | 29.6273 | 0.0000 | −6.5077 |
| 61 | 29.7249 | 0.0000 | −6.7570 |
| 62 | 29.8257 | 0.0000 | −7.0076 |
| 63 | 29.9287 | 0.0000 | −7.2607 |
| 64 | 30.0332 | 0.0000 | −7.5173 |
| 65 | 30.1381 | 0.0000 | −7.7786 |
| 66 | 30.2424 | 0.0000 | −8.0455 |
| 67 | 30.3445 | 0.0000 | −8.3189 |
| 68 | 30.4430 | 0.0000 | −8.5997 |
| 69 | 30.5361 | 0.0000 | −8.8885 |
| 70 | 30.6217 | 0.0000 | −9.1860 |
| 71 | 30.6973 | 0.0000 | −9.4922 |
| 72 | 30.7604 | 0.0000 | −9.8076 |
| 73 | 30.8084 | 0.0000 | −10.1331 |
| 74 | 30.8398 | 0.0000 | −10.4698 |
| 75 | 30.8534 | 0.0000 | −10.8171 |
| 76 | 30.8473 | 0.0000 | −11.1744 |
| 77 | 30.8203 | 0.0000 | −11.5402 |
| 78 | 30.7706 | 0.0000 | −11.9134 |
| 79 | 30.6967 | 0.0000 | −12.2922 |
| 80 | 30.5972 | 0.0000 | −12.6752 |
| 81 | 30.4706 | 0.0000 | −13.0599 |
| 82 | 30.3159 | 0.0000 | −13.4440 |
| 83 | 30.1320 | 0.0000 | −13.8251 |
| 84 | 29.9179 | 0.0000 | −14.2002 |
| 85 | 29.6733 | 0.0000 | −14.5662 |
| 86 | 29.3976 | 0.0000 | −14.9200 |
| 87 | 29.0912 | 0.0000 | −15.2581 |
| 88 | 28.7544 | 0.0000 | −15.5772 |
| 89 | 28.3880 | 0.0000 | −15.8737 |
| 90 | 27.9933 | 0.0000 | −16.1441 |
| 91 | 27.5720 | 0.0000 | −16.3853 |
| 92 | 27.1261 | 0.0000 | −16.5941 |

-continued

COORDINATE SET S

| i | $x_i$ (mm) | $y_i$ (mm) | $z_i$ (mm) |
|---|---|---|---|
| 93 | 26.6579 | 0.0000 | −16.7677 |
| 94 | 26.1704 | 0.0000 | −16.9033 |
| 95 | 25.6667 | 0.0000 | −16.9988 |
| 96 | 25.1501 | 0.0000 | −17.0525 |
| 97 | 24.6241 | 0.0000 | −17.0631 |
| 98 | 24.0909 | 0.0000 | −17.0301 |
| 99 | 23.5501 | 0.0000 | −16.9539 |
| 100 | 23.0012 | 0.0000 | −16.8361 |
| 101 | 22.4447 | 0.0000 | −16.6782 |
| 102 | 21.8811 | 0.0000 | −16.4828 |
| 103 | 21.3114 | 0.0000 | −16.2528 |
| 104 | 20.7368 | 0.0000 | −15.9915 |
| 105 | 20.1580 | 0.0000 | −15.7026 |
| 106 | 19.5765 | 0.0000 | −15.3902 |
| 107 | 18.9932 | 0.0000 | −15.0583 |
| 108 | 18.4091 | 0.0000 | −14.7110 |
| 109 | 17.8250 | 0.0000 | −14.3523 |
| 110 | 17.2417 | 0.0000 | −13.9860 |
| 111 | 16.6599 | 0.0000 | −13.6156 |
| 112 | 16.0801 | 0.0000 | −13.2446 |
| 113 | 15.5027 | 0.0000 | −12.8758 |
| 114 | 14.9283 | 0.0000 | −12.5121 |
| 115 | 14.3571 | 0.0000 | −12.1558 |
| 116 | 13.7894 | 0.0000 | −11.8088 |
| 117 | 13.2254 | 0.0000 | −11.4731 |
| 118 | 12.6651 | 0.0000 | −11.1501 |
| 119 | 12.1088 | 0.0000 | −10.8408 |
| 120 | 11.5564 | 0.0000 | −10.5463 |
| 121 | 11.0080 | 0.0000 | −10.2673 |
| 122 | 10.4638 | 0.0000 | −10.0041 |
| 123 | 9.9249 | 0.0000 | −9.7577 |
| 124 | 9.3943 | 0.0000 | −9.5280 |
| 125 | 8.8748 | 0.0000 | −9.3149 |
| 126 | 8.3678 | 0.0000 | −9.1178 |
| 127 | 7.8745 | 0.0000 | −8.9360 |
| 128 | 7.3952 | 0.0000 | −8.7689 |
| 129 | 6.9301 | 0.0000 | −8.6156 |
| 130 | 6.4790 | 0.0000 | −8.4753 |
| 131 | 6.0414 | 0.0000 | −8.3473 |
| 132 | 5.6166 | 0.0000 | −8.2307 |
| 133 | 5.2036 | 0.0000 | −8.1249 |
| 134 | 4.8017 | 0.0000 | −8.0291 |
| 135 | 4.4096 | 0.0000 | −7.9427 |
| 136 | 4.0263 | 0.0000 | −7.8651 |
| 137 | 3.6505 | 0.0000 | −7.7958 |
| 138 | 3.2811 | 0.0000 | −7.7344 |
| 139 | 2.9166 | 0.0000 | −7.6803 |
| 140 | 2.5558 | 0.0000 | −7.6333 |
| 141 | 2.1972 | 0.0000 | −7.5931 |
| 142 | 1.8394 | 0.0000 | −7.5593 |
| 143 | 1.4806 | 0.0000 | −7.5319 |
| 144 | 1.1192 | 0.0000 | −7.5106 |
| 145 | 0.7534 | 0.0000 | −7.4954 |
| 146 | 0.3811 | 0.0000 | −7.4862 |
| 147 | 0.0000 | 0.0000 | −7.4832. |

\* \* \* \* \*